(12) United States Patent  (10) Patent No.: US 8,707,308 B1
Naamad et al.  (45) Date of Patent: *Apr. 22, 2014

(54) METHOD FOR DYNAMIC MANAGEMENT OF SYSTEM RESOURCES THROUGH APPLICATION HINTS

(71) Applicant: EMC Corporation, Hopkinton, MA (US)

(72) Inventors: Amnon Naamad, Brookline, MA (US); David Stephen Reiner, Lexington, MA (US); John S Harwood, Paxton, MA (US); David L Black, Acton, MA (US)

(73) Assignee: EMC Corporation, Hopkinton, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/758,101

(22) Filed: Feb. 4, 2013

Related U.S. Application Data

(63) Continuation of application No. 12/827,092, filed on Jun. 30, 2010, now Pat. No. 8,381,213.

(51) Int. Cl.
*G06F 9/46* (2006.01)

(52) U.S. Cl.
USPC .......................................................... 718/100

(58) Field of Classification Search
None
See application file for complete search history.

(56) References Cited

U.S. PATENT DOCUMENTS

2006/0184559 A1* 8/2006 Arrouye et al. ............... 707/101
2007/0174308 A1* 7/2007 Rausch ......................... 707/100
2008/0133597 A1* 6/2008 Bardsley et al. ........... 707/104.1

* cited by examiner

*Primary Examiner* — Emerson Puente
*Assistant Examiner* — Sisley Kim
(74) *Attorney, Agent, or Firm* — Krishnendu Gupta; Joseph D'Angelo

(57) ABSTRACT

A method, system and program product for dynamic management of system resources in a data storage system comprising producing a hint at a hint producer; wherein the hint contains information about the system, consuming the hint at a hint consumer, and determining, at the hint consumer, whether or not to act on the information in the hint.

17 Claims, 20 Drawing Sheets

Hint ~ 510
Header ~ 520
  Hint Producer ID: Database analysis application
  Certainty    : 80%
  Importance: 70
Object ~ 530
  Object ID: Product Catalogs
  Object Level Classification: Storage Set
Target Time Window ~ 540
  Time Window Specification: [8AM – 9AM on weekdays]
Details ~ 550
  Workload Type, "Read"
  Workload Intensity, "High

FIG. 5

Hint ~ 610
Header ~ 620
  Hint Producer ID: Financials Database
  Name of Hint: "End of Month Reporting"
  Certainty    : 100%
  Importance: 100
Object ~ 630
  Object ID: Product Catalogs
  Object Level Classification: Storage Set
Target Time Window ~ 640
  Time Window Specification: [5PM, 11/29/2009 – 7AM, 11/30/2009]
Topic Details ~ 650
  Workload Type, "Reads"
  Throughput Goal, "High"

FIG. 6

Hint ~710
Header ~720
 Hint Producer ID: Job Scheduler XYZ
 Name of Hint: "Weekend"
 Certainty: 90%
 Importance: 80
Object ~730
 Object ID: Pharmaceutical Trials
 Object Level Classification: Volume [File system]
Target Time Window ~740
 Time Window Specification: [Sat – Sun, weekly]
Details ~750
 Data Action Intent, "Write Unlikely, Read Unlikely"
 Throughput Goal, "Low"

FIG. 7

Hint~810
Header~820
　　Hint Producer ID: Human
　　Name of Hint: "Archive purchases more than 5 years old"
　　Certainty: 80%
　　Importance: 60
Object~830
　　Object ID: Customer Purchase Tablespace Segment 25632
　　Object Level Classification: Sub-Volume
Target Time Window~840
　　Time Window Specification: [now]
Details~850
　　Workload Type, "All"
　　Workload Intensity, "Very Low"
　　Cost Goal: "50% Lower"

FIG. 8

METHOD FOR DYNAMIC MANAGEMENT OF SYSTEM RESOURCES THROUGH APPLICATION HINTS

RELATED APPLICATION

This application is a continuation of U.S. patent application Ser. No. 12/827,092 filed on Jun. 30, 2010 entitled "METHOD FOR DYNAMIC MANAGEMENT OF SYSTEM RESOURCES THROUGH APPLICATION HINTS," the content and teachings of which are hereby incorporated by reference in their entirety.

A portion of the disclosure of this patent document may contain command formats and other computer language listings, all of which are subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

This application related to dynamic management of system resources.

BACKGROUND OF THE INVENTION

Host processor systems may store and retrieve data using one or more data storage systems containing a plurality of host interface units (host adapters), disk data storage devices, and disk interface units (disk adapters), as well as a cache memory. Such data storage systems are provided, for example, by EMC Corporation of Hopkinton, Mass. and disclosed in U.S. Pat. No. 5,206,939 to Yanai et al., U.S. Pat. No. 5,778,394 to Galtzur et al., U.S. Pat. No. 5,845,147 to Vishlitzky et al., and U.S. Pat. No. 5,857,208 to Ofek. The host systems access the data storage systems through a plurality of channels provided therewith. Host systems provide data and access control information through the channels of the data storage systems and the data storage systems provide data to the host systems also through the channels.

The host systems do not address the disk data storage devices of the data storage system directly, but rather, access what appears to the host systems as a plurality of logical volumes. These logical locations are mapped into physical locations on the disk data storage devices, but the logical volumes may be larger or smaller than the corresponding disk data storage devices, and may span multiple drives. A single logical location may also be mapped to multiple physical locations, when, for example, data mirroring is desired.

Cache memory may be used to store frequently accessed data for rapid access. Typically, it is time-consuming to read or compute data stored in the disk data storage devices. However, once data is stored in the cache memory, future use can be made by accessing the cached copy rather than reading it from the disk data storage device, so that average access time to data may be made lower.

One technique for expediting read requests involves prefetching data units so that more data units will available from cache memory rather than from disk storage. Typically, prefetching is implemented by reading data units in blocks in response to one or more requests to read a data unit. Since a request to read a specific data unit increases the likelihood that access to other, related data units will soon be required, the read request for the data unit may trigger a prefetch request to read related data units as well, particularly when a read request results in reading a data unit off-cache rather than from the cache memory.

Prefetching requires a significant number of cache-slots to be available in the cache memory. When long sequences of data units are prefetched into the cache memory, other data units typically have to be removed in the cache memory in order to make room for the newly prefetched data units.

One problem with prefetching is that the data units that are prefetched are not necessarily going to be accessed, for example by a host processor. A possibility arises that the host processor will access them because they are adjacent to a data unit that it had required, but it is not a certainty that the host processor will require the prefetched data units.

Prefetching involves retrieving data units that the host may or may not need. On the other hand, prefetching involves removing in-cache data units that still have some probability of being accessed. Therefore, prefetching raises the possibility that data units for which the host processor requires access may be replaced by data units for which the host processor does not and never will require access. It is therefore, important to remove cache data that is not likely to be still required by the data storage system. Cache Pollution is defined to be the population of the cache memory with data units that are not required for re-accessing, for example, by a host processor.

As noted before, a read request for data units that are out-of-cache will take longer to execute than a request for data units that are in-cache. Therefore, it is not preferable to retrieve the data unit e from its location off-cache if it can be read from an in-cache location. In addition, procedurally, a disk adapter will execute a read request before it completes a prefetch operation. Therefore, the disk adapter will execute the read request for the data unit e before it completes the prefetch operation in which the data unit e would have been retrieved.

SUMMARY OF THE INVENTION

A method, system and program product for dynamic management of system resources in a data storage system comprising producing a hint at a hint producer; wherein the hint contains information about the system, consuming the hint at a hint consumer, and determining, at the hint consumer, whether or not to act on the information in the hint.

BRIEF DESCRIPTION OF THE DRAWINGS

The present invention will be more fully understood and appreciated from the following detailed description, taken in conjunction with the drawings in which:

FIG. 5 illustrates an embodiment of a hint according of the current invention;

FIG. 6 illustrates an alternative embodiment of a hint according to the current invention;

FIG. 7 illustrates an alternative embodiment of a hint according to the current invention;

FIG. 8 illustrates an alternative embodiment of a hint according to the current invention;

DETAILED DESCRIPTION OF THE EMBODIMENT(s)

Figure 1:
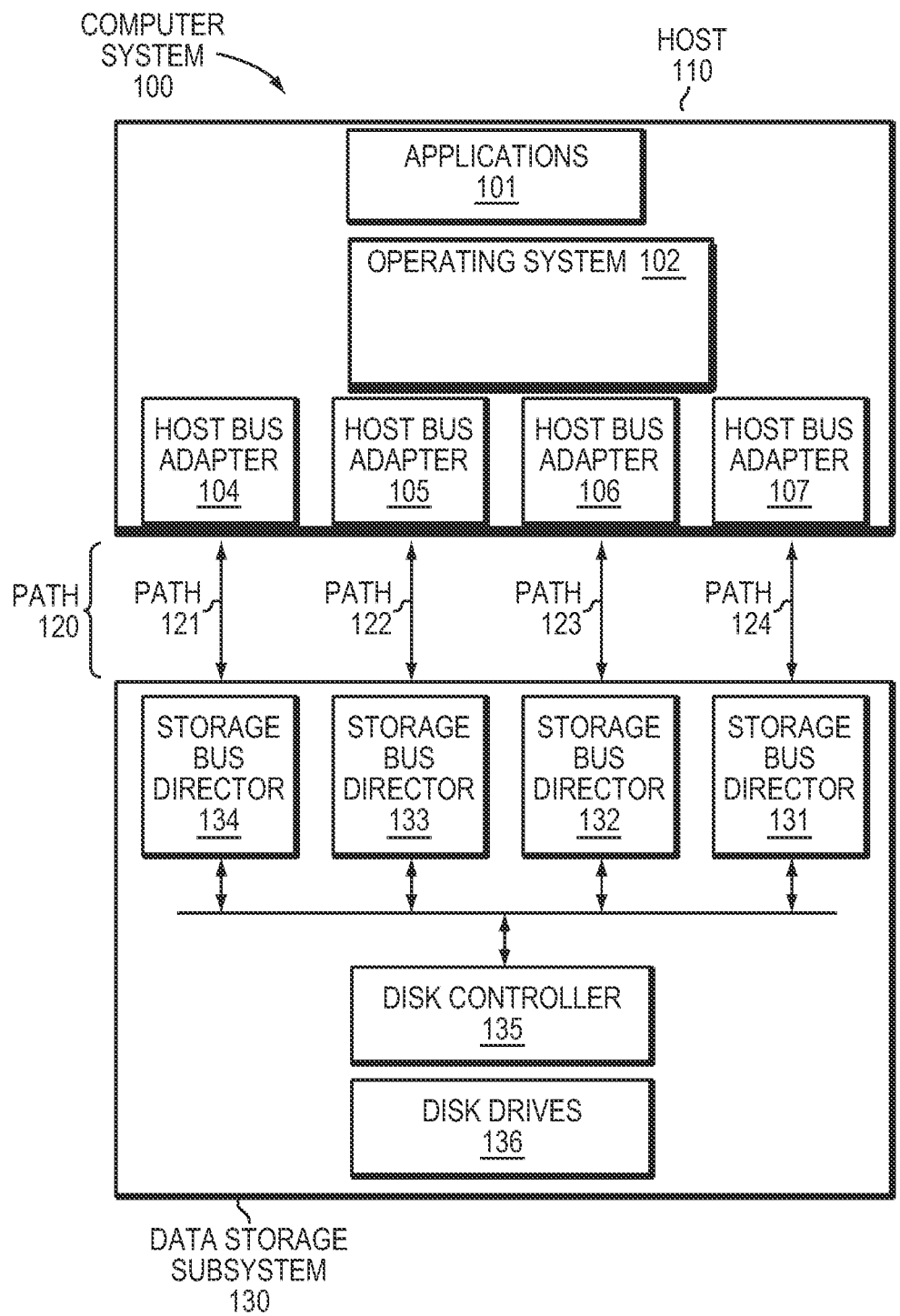
FIG. 1 shows an embodiment of a system on which the current invention may be practiced.

Some typical storage platforms, such as those made by EMC®, may adapt to workload dynamics but typically do not have a complete picture of future application needs or of the importance or other classification of the data elements being stored and accessed. Hints or metadata from applications to storage platforms about future events and data elements may enable these platforms to better manage capabilities such as storage tiering.

In an embodiment, the current invention may enable communication between and within a host, host applications, and a storage device. The communication may be in the form of hints containing meta data about the current and future data requests, requests for profiling, or other information. The hints may be provided from a hint producer, such as an application, to a hint consumer, such as tiering software on a storage device. In some embodiments, the hint may be acted upon by a hint consumer.

Conventional resource managers usually try to infer application-level event boundaries, process priorities, and data importance from a limited, low-level view of information access and processing. Typically this process of inference is difficult at best and often does not yield optimal results. Further, conventional applications and administrators may issue commands (rather than hints), which usually require detailed knowledge of low-level parameters and policies that is often hard to obtain. As well, the commands may limit flexibility and extensibility of resource managers to balance the needs of multiple clients.

In some embodiments, the hint produced by the hint producer at a particular level, such as an application level, may be translated by a hint transformer, to the level of the hint consumer. Hint transformers may analyze hints and transform them into new, related hints; these transformations may affect objects, service level objectives (SLOs), details, classifications, time, information hiding, or other aspects of hints.

In at least some embodiments, the hint consumer may be at a storage device level. In alternative embodiments, the hint transformer may translate application information to volumes or sub-volumes for a storage device. In some embodiments, the hint may be used to enable application of policies. In further embodiments, a policy may be target a particular level of service.

In certain embodiments, the current invention may loosely couple hint producers and hint consumers, improving agility. In some embodiments, the current invention may use compatible representations and semantics for hints, so that multiple hints, or hints from multiple sources, can be considered together. In other embodiments, the current invention may allow external hints to be combined easily with analytically-derived internal knowledge within the management application (such as fully automated storage tiering (FAST)) for joint consideration.

In further embodiments, the current invention may support the addition of plug-in components that could produce, transform, or consume hints about specialized domains such as compliance. In still further embodiments, the current invention may obviate the need by the hint consumer to understand the original context of the hint producer. In yet other embodiments, the current invention may obviate the need by the hint producer to understand the target context of the hint consumer.

The following terminology may be useful in considering the instant disclosure

Active hint—may be a hint whose time window has not yet ended or a hint about a future event, where the time window for that event may not have started.

Application—may be software that may be used directly by end users or by other applications to perform tasks.

A Class—may be a value under a classification scheme.

A Classification scheme may be a named set of classes that can be associated with objects. A purpose of a classification scheme may be to allow the association of service level objectives with groups of data based on their content or value to the business.

Consumer—may be a management entity that may act on a hint

Duration—may be the length of time associated with a time window referenced by a hint Event—may be an identifiable occurrence that has significance for a data center, application, or management software (such as FAST). Events may be user generated or system-generated; they may happen once or may recur repeatedly; they may be predictable or not. Events may happen within a time window (i.e., during the time window when a database is being rebuilt) or may happen instantaneously (i.e., at the instant when a metric has crossed a significant threshold).

FAST—Management software that controls fully automated storage tiering (FAST).

Hint—may be information passed from one context to another where it may be considered and possibly acted upon. A hint may be information about an application's data, its workload, or future events, which may be considered when optimizing data placement.

Line of service—may be a distinct functional area for grouping related service level attributes. Example lines of service may include performance, availability, security and data leakage protection.

Policy—may be a definite goal, course or method of action to guide and determine present and future decisions and actions, based on conditions.

Policy based management—may be an architectural approach to establishment, monitoring and remediation of system behavior; it may be used to set goals and to trigger actions under certain conditions.

Producer—may be the creator of a hint. The creator may issue a hint on behalf of an application and does not necessarily need to be the application itself.

Resource management application or software—may be an application that manages resources such as storage, servers, and networks.

Service invocations—may be commands within a service-oriented architecture.

These may be orchestrated and issued, not hinted at, with the expectation that they will be carried out.

Service level—a service level may be a measurement, calculated metric, goal, or other characterization of an attribute of a service. In some embodiments, a "storage" line of service may have several service levels that are each described using Avg Input/Output operations per second (IOPS), Avg. Response Time, Variance of Response Time, Max Downtime per year, Max Latency.

Service Level Agreement (SLA)—may be an agreement between a service provider, such as an IT department, an Internet services provider, or an intelligent device acting to provide services, and a service consumer. A service level agreement may define parameters for measuring the service, and may state quantitative values for those parameters.

Service Level Objective (SLO)—may be one or more goals for a line of service such as performance or availability. Service Level Objectives may be defined as part of an SLA, or in a management application, and consist of targeted values or ranges for specific service level attributes for specified time windows. The actions of enforcing and reporting monitored compliance may be implemented through policy based management.

Storage set—may be a named collection of data volumes. The attributes for each of the volumes may be configured to be the same. Any volume selected from the Storage set may have equivalent capabilities to all other volumes in the storage set Time window—may be a continuous interval of time specified by a start time and an end time, or by a start time and duration.

Transformer—may be a process that sits logically between hint producers and hint consumers. Hint transformers may analyze hints and transform them into new, related hints; these transformations may affect objects, SLOs, details, classifications, time, information hiding, or other aspects of hints.

Working set—The working set of a process or application may be a collection of those pages in its virtual address space that have been recently referenced. It may include both shared and private data. A process or application may have an associated minimum working set size and maximum working set size. From a FAST perspective, a working set may be the data that accounts for a very high percentage of all IOs over a time window.

Storage Platforms

A computer system may include multiple hosts and multiple data storage subsystems such each host may access data on each of data storage subsystems. For simplicity, however, FIG. 1 illustrates a computer system 100 that includes a single host 110 and a single data storage subsystem 130. Applications 101 running on operating system 102 of host 110 may access data in data storage subsystem 130 via I/O driver 103 and host bus adapters 104, 105, 106, and 107. Host 110 can be, for example, a server, a personal computer, or any other device capable of initiating read and write requests to data storage subsystem 130. Data storage subsystem 130 can be a single physical data storage device or a data storage system comprising multiple physical data storage devices including an enterprise storage system. For example, data storage subsystem 130 may be a SYMMETRIX data storage system, available from EMC Corporation of Hopkinton, Mass., a CLARIION data storage system available from EMC Corp., a TagmaStore data storage system available from Hitachi Data Systems Corp. of Santa Clara, Calif., or a FAStT data storage system available from IBM. In computer systems consistent with the principles of the invention, there may be a plurality of data storage subsystems 130 accessible by host 110 and each data storage subsystem may be unique.

Host 110 has multiple paths 120 for sending I/O requests to data storage subsystem 130. Typically, there are at least two paths from a host to a data storage subsystem. FIG. 1 shows four paths from host 110 to data storage subsystem 130: path 121, path 122, path 123, and path 124. Each of the paths 120 can be any of a number of different types of communication links that allow data to be passed between data storage subsystem 130 and host 110. Each of the host bus adapters 104, 105, 106, and 107 would be adapted to communicate using an appropriate protocol via the paths 120. For example, path 120 can be implemented as a SCSI bus with host bus adapters 104 and storage bus director 134 each being a SCSI driver. Alternatively, path 120 between the host 110 and the data storage subsystem 130 may be a Fibre Channel fabric. Moreover, a path 120 may include multiple communication path types and may be part of a communication network.

Host 110 contains an operating system 102, applications 101, I/O driver 103, and host bus adapters 104, 105, 106, and 107. I/O driver 103 facilitates the sending of I/O requests from applications 101 running on host 110 to data storage subsystem 130. The I/O driver may queue I/O requests from host 110 directed to data storage subsystem 130. In addition, the I/O driver may implement algorithms to decide which I/O requests to send, how many I/O requests to send, and the speed at which to send I/O requests. The I/O driver may keep a record of I/O requests that are sent to data storage subsystem 130 until the I/O request is processed by data storage subsystem 130. An exemplary host I/O driver is the POWER-PATH tool, available from EMC Corp. The POWERPATH tool may use known path selection techniques such as those described in U.S. Pat. No. 6,542,944, entitled "Method And Apparatus For Balancing Workloads Among Paths In A Multi-Path Computer System Based On The State Of Previous I/O Operations" and issued on Apr. 1, 2003 to EMC Corp. As well, application Ser. No. 11/682,049 labeled "Methods And Systems For Dynamic Division of Path Capacity" provides a further description thereof. Both U.S. Pat. No. 6,542,944 and application Ser. No. 11/682,049 are hereby incorporated by reference. As well, co-owned applications numbered 12/494,622, 12/640,244, 12/639,469 and 12/640,244, titled "FACILITATING DATA MIGRATION BETWEEN TIERS," "AUTOMATED DATA RELOCATION AMONG STORAGE TIERS BASED ON STORAGE LOAD," "LOGICAL UNIT MIGRATION ASSISTANT FOR HARDWARE-BASED STORAGE TIERING," and "AUTOMATED DATA RELOCATION AMONG STORAGE TIERS BASED ON STORAGE LOAD," respectively, provide a further description of Fully Automated Storage Tiering (FAST).

Typically, the embodiment of FIG. 1 may not have a full understanding of the data being requested. However, dynamic management of system resources (such as storage) may benefit from knowledge of future application needs and of the importance or other classification of the data elements being stored, accessed, and manipulated. In some embodiments of the current invention, hints passed through a management interface from applications to resource managers (such as storage platforms) about future event patterns and about data elements may enable these platforms to better manage and optimize capabilities such as storage tiering and resource allocation. In an embodiment of the current invention, a hint may be a description passed from one context to another where it can be considered and may be acted upon. For example, a hint producer may be a database application and a hint consumer may be the storage device that manages what pieces of a LUN are kept in a cache or fast access storage. The database application may produce a hint, i.e., that an object contains indexes of a database needed for fast access, and the hint consumer may receive a hint about the Volumes or sub-volumes corresponding to that database object.

Differences in context between hint producers and hint consumers may be managed through hint transformations, which may be a flexible mechanism for mapping identity, objects, data classifications, security classifications, service level objectives, and details across contexts—including from, to, and within virtualized environments. Event profiling in response to hints may allow applications to engage system resource managers in capturing event details that can inform and improve dynamic management when application-level events recur.

In an alternative embodiments, the current invention presents an approach to dealing with hints from multiple sources, combining external hints with internal knowledge of resource managers, and resolving conflicting hints. A uniform hinting interface providing information to the storage device or storage platform may provide the storage device with a more complete picture of current and future application needs enabling the storage device to better respond to storage demands.

Typical storage platforms may provide performance optimization capabilities that can be applied to the volumes presented to servers and applications. Conventionally, these capabilities may be expressed at the lowest level in the host stack and may not be exported directly to applications. In many cases, optimization capabilities may be completely hidden from the servers and applications, acting to improve performance of the current or anticipated workload. Some examples of the capabilities incorporated in the EMC storage platforms may be storage tiering (FAST), cache partitioning and management, priority controls, compression and de-duplication.

As well, storage administrators may typically work with server and application administrators to best lay out volumes and apply capabilities to meet the application requirements. This may work for an initial storage layout and workload prediction, but as the application workload changes and more applications connect to the storage platform, management of platform capabilities may need to be dynamic to continually meet application requirements.

In an embodiment, the current invention enables creation of application hints to convey descriptions upon which action may be taken. In an alternative embodiment, the current invention enables mapping in an architecturally consistent way information from an application context to a resource management context, and separating high-level classifications from low-level policies. In some embodiments, the current invention enables an application to hint rather than to issue commands, where a command may require detailed knowledge about low level mechanisms. In further embodiments, the current invention enables a resource manager to consider multiple client needs and reconcile their priorities without the need to understand the original context.

Figure 2:
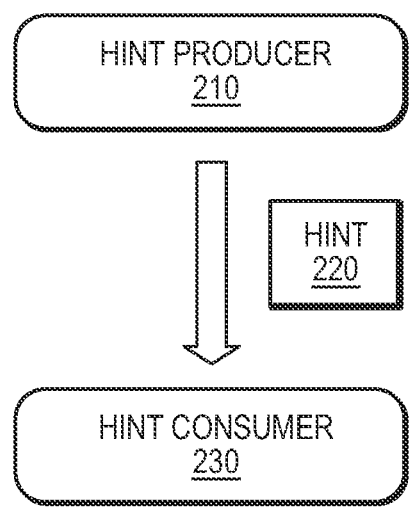
FIG. 2 illustrates an exemplary hint producer, a hint consumer, and a hint in accordance with an embodiment of the present invention.
Figure 3:
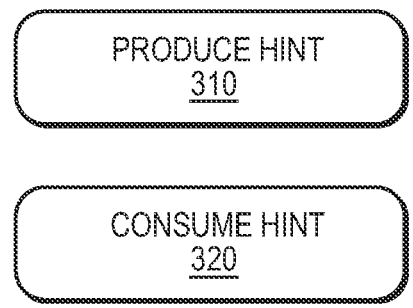
FIG. 3 illustrates an embodiment of a method of the present invention.

Refer to the embodiments of FIGS. 2 and 3. A hint producer 210 may produce 310 a hint 220 which may be received and consumed 320 by a hint consumer 230

Figure 4:
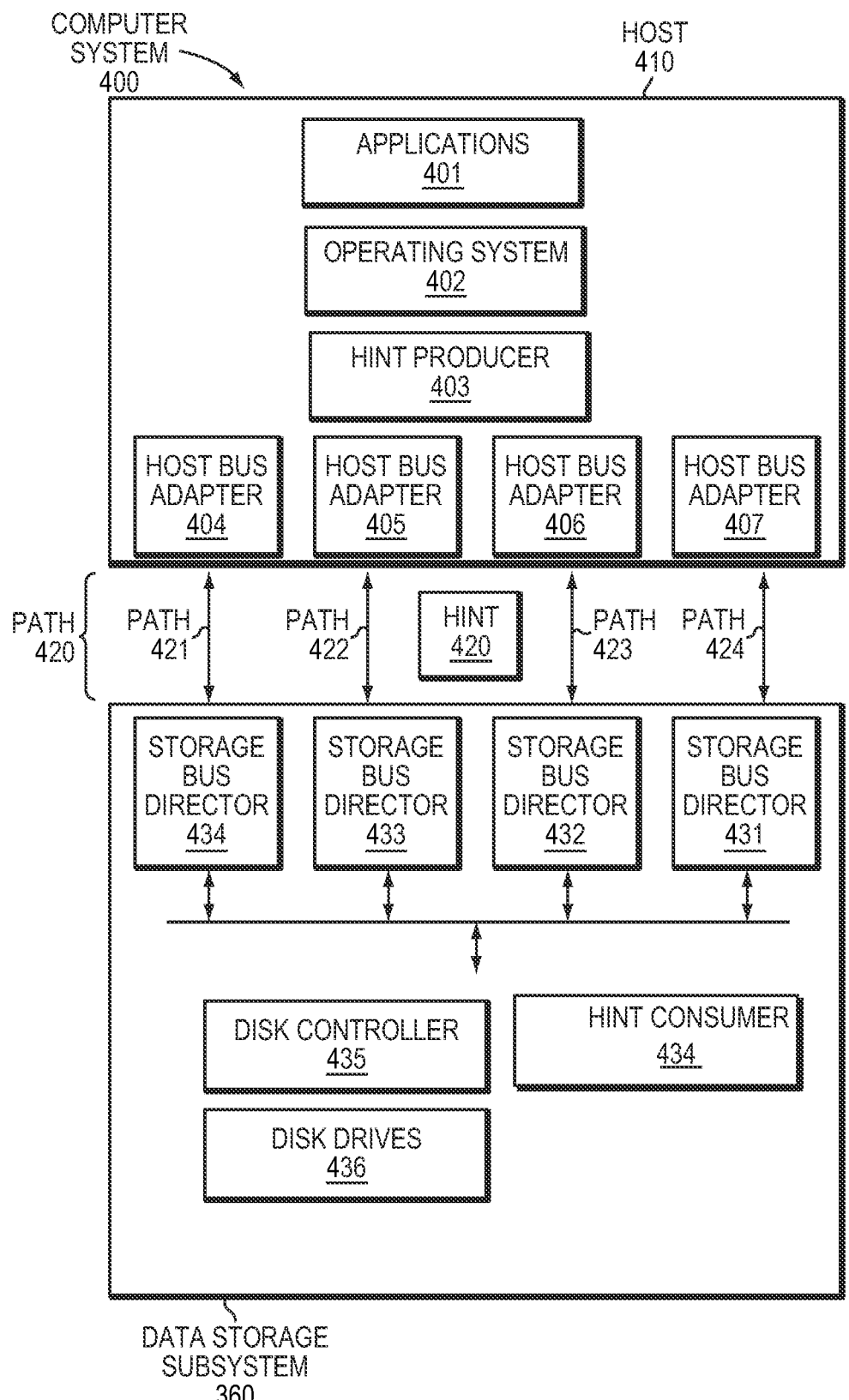
FIG. 4 shows an embodiment of a system in accordance with the current invention.

Refer now as well to the embodiment of FIG. 4. In FIG. 4, there is a host 410 which includes a hint producer 403. In this embodiment, hint producer 403 may produce 310 hints, such as hint 420. As well, the embodiment of FIG. 4 illustrates a data storage subsystem 360 with a hint consumer 434, which may consume 320 hints, such as hint 420.

Hints

In some embodiments, a hint may be a description passed from one context to another where the hint may be considered and may be acted upon. From a storage viewpoint, hints may cover various aspects of data characterization, workload changes, impending events, and so on. As well, the hint may be created by referring to concepts, objects or information familiar to the hint producer. That is, the hint may refer to database indices for a database or to a particular file to be accessed.

In general, a hint may be communicated to the storage device "out-of-band" or "in-band." In some embodiments, an out-of-band hint may be one that is communicated to the storage device outside of the direct I/O stream. An in-bound hint may be one that is communicated to the device via the I/O stream such as through I/O tagging. In at least some embodiments, a hint may be acted on while commands must be acted upon, regardless of whether or not the command completes successfully. In some embodiments, hints may be suggestions for actions or goals that may be achieved through best efforts, providing the hint does not conflict with other goals, existing policies, or other ongoing efforts by the recipients consuming the hints.

A hint may be used to help the storage device better manage the storage system. For example, a hint can be used to describe a future event profile, request profiling of an event, signal an event, identify importance of data extents, classify data extents, set goals for an application, or report goal achievement for an application.

Refer now to FIGS. 5-8. FIGS. 5-8 present sample embodiments of information which may be included in a hint. The sample embodiment of FIG. 5 presents an embodiment of a hint 510 describing a future workload. This hint 510 comprises a header 520, and object 530, a target time window 540, and details 550. The sample embodiment of FIG. 6 presents an embodiment of hint 610 describing performance goals for an application. This hint 610 comprises a header 620, and object 630, a target time window 640, and details 650. The sample embodiment of FIG. 7 presents an embodiment of hint 710 describing hints for data placement of extents [i.e. volumes or sub-volumes]. This hint 710 comprises a header 720, and object 730, a target time window 740, and details 750. The sample embodiment of FIG. 8 presents an embodiment of hint 810 describing performance goals related to information lifecycle management (ILM). This hint 810 comprises a header 820, and object 830, a target time window 840, and details 850.

Policies

In some embodiments, a policy may be a definite goal, course or method of action to guide and determine present and future decisions and actions, based on conditions. In other embodiments, policy based management may be an architectural approach to monitoring and remediation of system behavior. In certain embodiments, policy based management may be used to set goals and to trigger actions under certain conditions. In other embodiments, a policy based approach may be used to manage complex data center environments effectively. In certain embodiments, policies may incorporate administratively-defined rules to specify particular aspects of data processing, and provide an interface between human direction and machine enforcement.

In some embodiments, data centers may be dynamic in nature, and an associated policy system, rather than requiring explicit intervention for each individual event or processing operation may provide enhanced management including automation.

Hints and Policies

In some embodiments, a policy may be an approach to responding to one or more hints. In alternative embodiments, policies in various storage-related contexts may be triggered and executed based on the descriptive contents of hints. In other embodiments, policies may be about when and how hints should be made.

The following table shows an embodiment for connections between hints and policies (such as Promote data, Demote data, and Do nothing) for data placement, and illustrates sample differences between hints and policies. In certain embodiments, an application can influence data placement by identifying the importance of the data through hints, independently of the analysis performed by the storage platform for resource optimization, thereby helping to tailor usage to the application requirements.

| Hint Type | Hint Value | Current Data Placement | |
|---|---|---|---|
| | | High Enterprise Flash Drive (EFD) | Low Serial Advanced Technology Attachment (SATA) |
| Data Importance | High | Do nothing | Promote data |
| | Low | Demote data | Do nothing |

Producers and Consumers

Hints may be created by producers. In some embodiments, a hint producer may be an application, an operating system, or a management tool. In other embodiments, applications may be database analyzers, job schedulers, or other systems that detect patterns, classify data, or anticipate events and processing phase transitions. An application can be a hint producer, generating hints describing its data, its workload and its future goals. Alternatively, a management entity may produce hints on behalf of an application. The storage platform may be targeted as the hint consumer.

Hint consumers may be management applications, including optimizers, load balancers, data movers, schedulers, or array controllers. As well, a hint consumer can be any storage platform, or block or file based system. In some cases, a hint may be consumed by a storage platform, processed for local use and transformed for use downstream. An example of this is a hint delivered from an application to a File Server or other network based device, which is consumed by the file device and then transformed for downstream use at a block platform.

From a hint consumer perspective, the application that produced the hint is known, but the exact source of the hint within the application may not be distinguished (e.g., the application itself or a management interface). Hint consumers may assess and track the credibility of hints from specific applications, and may provide information about hint results.

Hint Transformation

In some embodiments, transforming a hint from a context familiar to a hint producer to a context familiar to a hint consumer may enable a loose coupling of the different contexts in the enterprise. This transformation may allow an application to express its requirements, in a hint, without understanding storage policies and capabilities to any level of detail. In at least some embodiments, this transformation may be necessary as the hint producer and hint consumer may exist in different contexts. In certain embodiments, a hint created at an application, referring to application specific information, may be transformed to a low level hint referencing a set of corresponding LUNs. The low level hint may then be interpreted by a policy which may express what to do in response to such a hint, including the possibility of acting on it or ignoring it.

In at least some embodiments, the hinting interface allows hint transformation by enabling a mapping from requirements to capabilities through subsequent storage management. In other embodiments, the application may dynamically update the storage platform with hints on data and operations, allowing the storage manager to make more informed, policy-driven decisions about applying resources and moving data to meet SLOs and other performance demands.

In some embodiments, a hint transformer may sit logically between hint producers and hint consumers. Hint transformers may analyze hints and transform them into new, related hints; these transformations may affect objects, SLOs, details, classifications, time, information hiding, or other aspects of hints.

Figure 9:
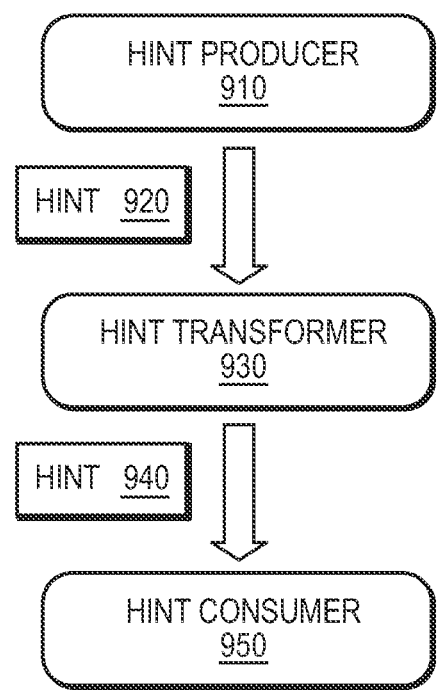
FIG. 9 illustrates an embodiment of the current invention comprising a hint producer, a hint, a hint transformer, a transformed hint, and a hint consumer.
Figure 10:
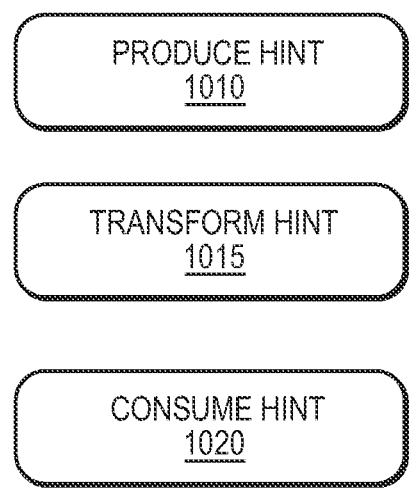
FIG. 10 illustrates an embodiment of a method of the present invention.

Refer now to the embodiments of FIGS. 9 and 10. In this embodiment, a hint producer 910 produces 1010 a hint 920. Hint 920 may be transformed 1015 by hint transformer 930 to become hint 940. Hint 940 may be consumed 1020 by hint consumer 950.

Figure 11:
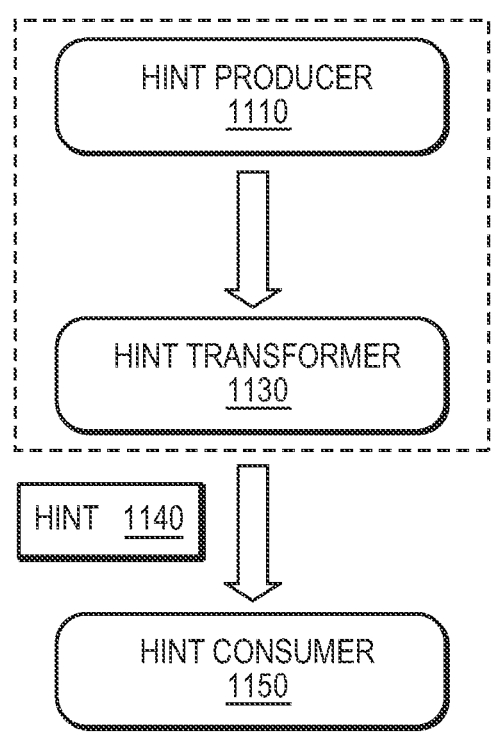
FIG. 11 illustrates an embodiment of the current invention comprising a co-located hint producer and hint transformer, and a hint consumer.
Figure 12:
FIG. 12 illustrates an alternative embodiment of a method of the present invention.

Refer now to the embodiments of FIGS. 11 and 12. In this embodiment, a hint producer 1110 may be co-located with hint transformer 1130. Hint producer 1110 may produce 1210 a hint, which is transformed 1215 by hint producer 1130 to become hint 1140. Hint 1140 may be consumed 1220 by hint consumer 1150.

Figure 13:
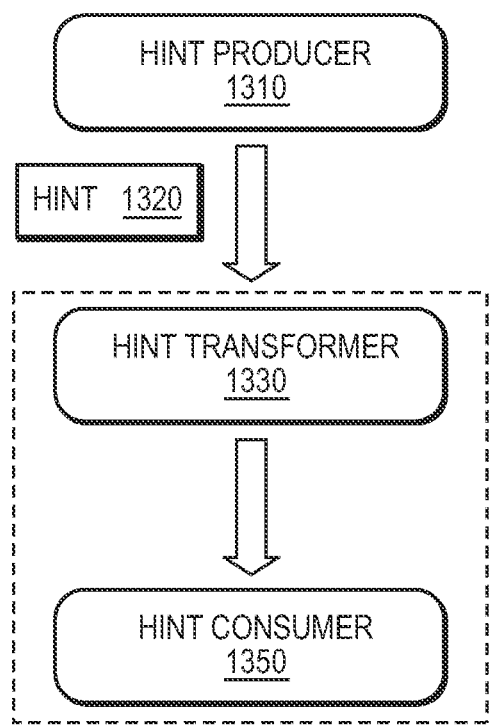
FIG. 13 illustrates an embodiment of the current invention comprising a co-located hint consumer and hint transformer, and a hint producer.
Figure 14:
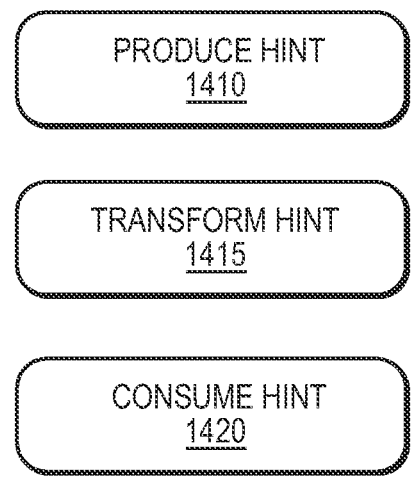
FIG. 14 illustrates a further alternative embodiment of a method of the present invention.

Refer now to the embodiments of FIGS. 13 and 14. In this embodiment, a hint producer 1310 produces 1410 a hint 1320. Hint 1320 may be transformed 1415 by hint transformer 1330, which is co-located with hint consumer 1350, which then consumes 1420 hint 1320.

Figure 15:
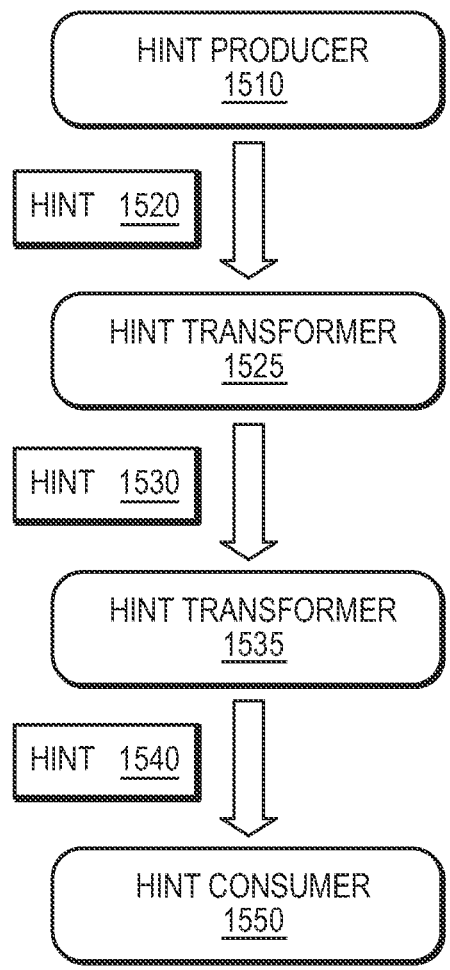
FIG. 15 illustrates an embodiment of the current invention comprising a hint producer, two transformed hints, two hint transformers, and a hint consumer.
Figure 16:
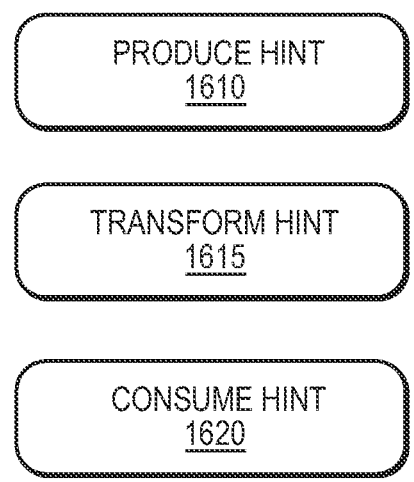
FIG. 16 illustrates a further alternative embodiment of a method of the present invention.

Refer now to the embodiments of FIGS. 15 and 16. In this embodiment, a hint producer 1510 produces 1610 a hint 1520. Hint 1520 may be transformed 1615 by hint transformer 1525 to become hint 1530. Hint 1530 may be transformed 1615 by hint transformer 1535 to become hint 1540. Hint 1540 may be consumed 1620 by hint consumer 1550. As well, in some embodiments, there may be any number of hint transformers and any number of transformations. Further, as shown in FIGS. 11-14, the hint transformer may be co-located with the hint producer or hint consumer.

Figure 17:
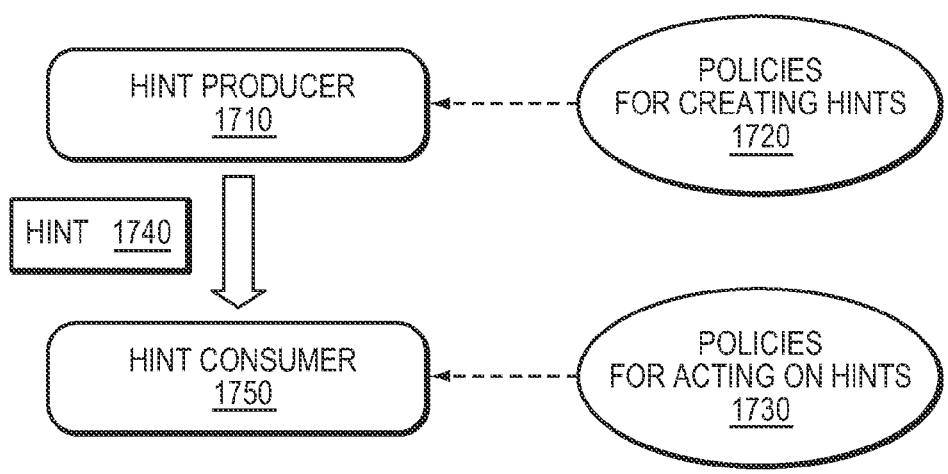
FIG. 17 illustrates an embodiment of the current invention comprising a policy for creating hints, a hint producer, a hint, a hint consumer, and a policy for action on hints.
Figure 18:
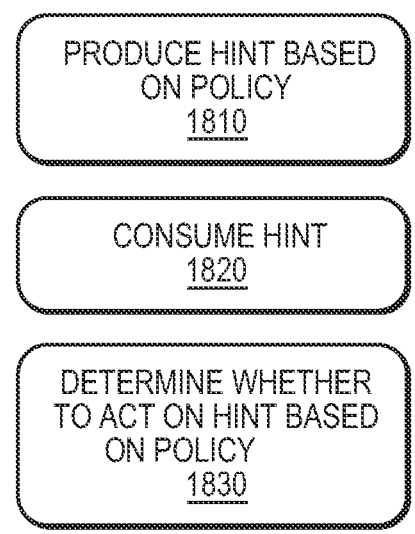
FIG. 18 illustrates a further alternative embodiment of a method of the present invention.

Refer now to the embodiments of FIGS. 17 and 18. In the embodiment of FIG. 17, hint producer 1710 may produce hints 1810, such as hint 1740 according to a policy 1720. As well, hint consumer 1750 may consume 1820 the hint and determine whether to act 1830 on the information in hint 1740 according to a policy 1730.

Service Levels

In the enterprise, there may be Service Level Agreements (SLAs) between business units and IT; i.e., between application users and application providers. To meet its SLA, an application such as SAP may have related requirements of the underlying service providers. However, in the storage domain there may not be a SLA that guarantees service delivery, but instead a Service Level Objective (SLO) where services may be delivered on a best effort basis.

Describing a Future Event Profile

In some embodiments, a hint may be used to describe a future event, such as a request for some data or an indication that a large amount of data will be requested at a given time. In other embodiments, a description of a future event profile may include the expected type of workload, its intensity, its focus on certain areas of data (which may become more active or less active), the expected time window, and an estimated level of certainty that the event will actually occur. The description may be based on an expected event in the data center.

In certain embodiments, a hint about a future data request might enable a storage system to prefetch data to prime storage types ahead of time, prefetch more data to cache, migrate data to SATA, or optimize MAID to spin down drives. In other embodiments, if the hint contains specific indications about the data and timing, the storage system may keep data of a process in prime storage types to provide high performance when the process restarts, donate the prime storage types of a process to other applications or processes, such as when a hint gives advance knowledge about when a process will start.

In some embodiments, an application may perform the same job every end-of-week. In certain embodiments, instead of having the storage system work to predict that this data is needed at this time, the application may identify this pattern and describe its profile immediately via a hint.

Profiling of an Event

A hint may request that the hint consumer construct an event profile, including the type of workload, its intensity, its focus on certain areas of data (which may become more active or less active), and the time window used in developing the profile. In some embodiments, the hint producer may request the profile in order to provide the hint consumer with knowledge that an event with a similar profile may occur again. In certain embodiments, the hint producer may trigger such a request when the hint producer may not know, a priori, the impact of an event or the details of the profile that may be created for the event. In one embodiment, a hint producer may send a hint to the storage device that a batch process, called "financial_rollup," is about to be kicked off by a job scheduler. In this embodiment, the hint producer may have information that this event is expected to recur, but the details of its workload and working set are not known.

Signal an Event

In another embodiment, given a profile for an event, an upcoming instance of the event's occurrence may be signaled through a hint. In a further embodiment, a job scheduler may signal that "financial_rollup" is about to be kicked off in a hint. In this embodiment, the details for this event may be taken either from a previous descriptive hint or from the results of a hint that requested profiling of this event.

Identify Importance of Data Extents

In still other embodiments, a hint may describe which extents (e.g. volumes, sub-volumes) are important to an application or process for an expected time window. The hint may also describe aspects of why this data is important, including expected types of access. In one embodiment, a storage set containing product catalogs may important to an on-line commerce application from 8-9 AM on weekdays as it may be read with high intensity. In some embodiments, a hint may provide the storage system with the information about what extents correspond to the data so it may be moved to quickly accessible storage or cache memory.

In an alternative embodiment, a set of extents may represent data likely to be accessed synchronously, such as metadata or index traversals. I/Os to these extents may have a high impact on application performance. In such an embodiment, a hint may convey this information to the storage device. In turn, the storage device or a hint consumer may use this information to satisfy the conditions of a particular policy and then to apply that policy.

In yet a further embodiment, a query may require 20 I/Os of which the first 10 are dependent (meaning the n+1st I/O can start only after the completion of the n-th I/O) and the last 10 are asynchronous. In this further embodiment, improving the response time of the first 10 I/Os may have more impact on the query time than improving the response time of the last 10 I/Os. In this embodiment, a hint may relay this information to the hint consumer to allow it to alter the behavior of the storage device to better service the dependent requests than the independent requests.

Classify Data Extents

In an embodiment, an application that has specific knowledge about the classification of data extents may hint about these extents and their associated classifications. In some embodiments, the hint producer may produce a hint which classifies data extents as meta data for a file system or as data containing MP3s.

In a further embodiment, a hint consumer may consume these hints which may trigger the application of a policy such as storing metadata extents in EFD and the MP3 extents on SATA. In alternative embodiment, metadata not frequently accessed may normally be stored on slower storage, however through hints the application can signal to promote the appropriate extents to faster storage. This may allow the fastest access for metadata even though it is not accessed frequently.

In yet a further embodiment, a hint may be generated about a sub-volume corresponding to segment 25632 of a customer purchase tablespace; the sub-volume is classified as "archivable" according to a high-level Information Lifecycle Management policy of archiving purchases more than 5 years old. This may lead to the sub-volume being demoted since the anticipated access intensity is very low.

Setting Goals for an Application

A hint may describe performance or cost goals for an application or event for a time window, either in general or for a specified set of extents. In an embodiment, reads to the customer transaction tablespace during end-of-month reporting in a Financial Application, (represented by a particular storage set) may need less than 2 ms average response time as an SLO. Without a hint, the storage device may not guarantee that performance goals will always be achieved; however, goals may guide the system to achieve system level optimization by dynamically allocating prime resources (such as EFD) to the applications. In an alternative embodiment, if the performance goals of an application can be achieved with less than the full allocation of resources for the application, then the application may have the option of donating some of its prime resources to other applications for overall systems performance optimization. The end result may be to enable storage systems to be more application-aware through hints.

In an alternative embodiment, a retailer's extensive product catalog exists in storage extents within a particular storage set. In this embodiment, the catalog is replaced by a new catalog which results in a lowering of performance requirements for reads and writes to the old version.

In some embodiments, hints may be used to help achieve service level specifications for lines of service such as availability and security.

Reporting Achievement of a Goal for an Application

In another embodiment it may be beneficial for an application to report achievement of one of its goals. In a sample embodiment, if application service level objectives are being met, this knowledge may enable the storage system to better optimize its performance. In a particular embodiment, when a hint consumer such as FAST is notified that an SLO is being met, the hint consumer may decide not to consider the data extent involved as part of the FAST engine analysis or might relax its efforts to improve service levels. In an alternative embodiment, if the hint producer identifies the current service level as below current needs, the storage platform may be notified by a hint to consider implementing remediation policies that allow it to adjust resources accordingly to meet application SLOs.

Uniformity and Consistency of Hint Expression

In certain embodiments, it may be useful to use a standardized format for hints. In some embodiments, external hints and internal "learnings" may be expressed uniformly and consistently. Expressing hints consistently may enable storage tiering, such as FAST, to consider external hints about processes together with its own learned knowledge of events and historical access behavior. In an alternative embodiment, expressing hits consistently may enable storage tiering, such as FAST, to consider an event profile whether it was externally specified in detail by an application such as SAP, or constructed by FAST in response to SAP's hints requesting the event profile.

Loose Coupling of Hint Producers and Hint Consumers

By enabling a hint to be produced at a different level than the level at which the hints are consumed, the hint consumer and hint producers may be loosely coupled and may not need detailed knowledge of each other's internal workings. In some embodiments, hints may be considered disclosures of meta data about an object. In further embodiment, policy enforcement, based on the hints, may be decoupled from classifications or hints that are passed in hints. This may allow for various policy engines to act on a classification and may require no changes to classification engines to accommodate updates to policies. In further embodiments, this coupling enables multiple classification schemes to be accommodated and leveraged.

In some embodiments, there may be hint producers, hint transformers that may transform the hints from the producer level to the consumer level, hint consumers, and policy engines, where the policy engine may act on the hints.

Hint Parameters

A hint may be delivered to a storage device any number of ways such as with an Application Programming Interface (API), a Command Level Interface (CLI), a Storage Management Initiative Specification (SMI-S) provider, or management User Interface (UI). In some embodiments, an application may provide certain characteristics in a hint. In certain embodiments, to enable control of FAST, data placement, array performance, cache management, priority controls and other services, the hint may include one or more parameters. In some embodiments, the one or more parameters may include a name, an application, a level of certainty, an object of hint, a classification of object, a time window start, a time window duration, a time window recurrence, an event profile indicator, or a service level status. In other embodiments, the inclusion of multiple parameters enables hints about complex application behavior over time (i.e., specific storage volumes are likely to be accessed during a time window but are not likely to be accessed after a specific event has occurred.)

Hint Name

In certain embodiments, a parameter of a hint may be a name. The hint name may describe the hint in a human-friendly way, enable logging of the hint by name, or creating a unique identifier for a new hint for later re-use. In certain embodiments, a hint could be named identify_metadata, identify_key_lookup_tables, identify_high_read_activity, signal_weekday_production_start, signal_end_of_month_reporting_top, signal_database_rebuild_start, or PCI_audit_request_profile_start. In alternative embodiments, the combination of application identifier and hint name may be unique.

Application Identifier

In further embodiments, one of the parameters of a hint may be an application identifier. In some embodiments, the producer of the hint may identify the application in the hint for logging purposes. In other embodiments, the hint producer and the application may not have to be the same entity. In these embodiments, the producer may be authenticated through the management interface and may be logged as part of the connection. A special case of an application identifier may be a virtual machine ID, with a VMware ESX server or other hypervisor producing the hint.

Level of Certainty

In alternative embodiments, a parameter of the hint may be a level of certainty. In at least some embodiments, the hint producer may provide hint consumers with information about the data to be accessed and level of certainty for the hint. The level of certainty may be factored into the management plan for execution or for policy enforcement.

Object Identifier

In further embodiments, a parameter of a hint may be an object identifier. In certain embodiments, the hint may represent an object at the hint producer level to be conveyed to the hint consumer. This may be in terms of volumes and sub-volumes for a block device, and in terms of file systems, directories and files for a file-oriented device. In some embodiments, the application may be aware of application data objects but not the mapping to data extents, which may result in the need for the information in the hint to be translated by a hint transformer for a hint consumer.

Classification of Object

In certain embodiments, a parameter of a hint may classify an object. In further embodiments, the hint may provide classification of an object to enable the storage system to optimize performance or to map specific storage services to the object in the hint. In some embodiments, a key classification scheme may be around the importance of the data object, which may be much clearer to the hint producer than to the hint consumer. Classifications may include security, availability, (future) workload type, and workload intensity. In other embodiments, classification schemes and classes may be repeated. In further embodiments, examples of goal classification schemes and classes may be throughput goal: High, response time goal: Shorter, and cost goal: Lower. In other embodiments, the classes may be taken from (Extreme, High, Average, Low, Zero), (Shorter, Longer), and (Higher, Lower), respectively.

Importance Qualifier

In some embodiments, a parameter of a hint may include an importance qualifier. In an embodiment, the storage platform may have the ability to manage storage types, cache and priorities for I/O streams. In other embodiments, if the importance of the data is described, then the storage platform may be able to discern how to use internal resources for a given extent range and I/O flow. In alternative embodiments, important data may be prioritized or pinned to a responsive storage type or cache. In certain embodiments, unimportant data may be moved to a less responsive storage type, evicted from cache, or lowered in priority for internal resources. In other embodiments, higher importance hints may be linked to achieving better response time, prefetching data, or migrating to EFD. In still other embodiments, lower importance hints may be linked to migrating data to SATA or not considering requirements for response time Type of Workload In some embodiments, a parameter of a hint may include the type of the workload. In certain embodiments, the type of the workload may be from a simple classification scheme (i.e. in the storage domain) whose classes are Reads, Writes, and All, or from a more complex classification scheme with classes such as "Write Once, Read Unlikely", where data is accessed on initial write but unlikely to be accessed again allowing the storage platform to reallocate resources.

In other embodiments, the type of workload may be from a classification scheme described by the type of application processing, with classes such as Archiving and Backup, Computer Aided Design, Configuration Management Database (CMDB), Data Mining, Data Warehouse Load, Decision Support (DS) over Traditional DBMS, Decision Support (DS) over Columnar DBMS, Development (Programming) Environment, Digital Media Processing, E-Commerce System, Email System Operation, Email System Maintenance, Enterprise Resource Planning (ERP) System, File Processing, Financial Reconciliation, Healthcare Processing, Mixed Application Environment, NASA Advanced Supercomputing (NAS) Benchmark, N-Body Problem Calculations, Online Transaction Processing (OLTP), Personal Information Management, Telecom Processing, Transactional Content Management, Virtual Data Center/Cloud, Web Edge Cache Server, and Web Index Search Engine.

Intensity of Workload

In other embodiments, a parameter of a hint may include the intensity of the workload. The intensity of the workload may be a simple classification scheme such as (H/M/L) or a more complex scheme that deals with relative intensity (i.e. higher than usual/Lower than usual).

Time Window Start

In certain embodiments, a parameter of a hint may denote a particular time window, or interval of time. The beginning of the time window may be described in day/date format, although synchronization between application and storage platform time may be related. There may be multiple ways of specifying time windows (e.g. absolute vs. relative, simple vs. complex, one-time vs. recurring). In some embodiments, if the hint does not specify the time window start is taken as immediate, the format may be in absolute time describing date DDMMYYY and time HHMM in 24 hour format. In other embodiments, the time window start may be relative to a future event (e.g., to specify that certain data is very unlikely to be accessed again after a future event such as end of month processing).

Time Window Duration

In alternative embodiments, a parameter of a hint may denote how long an event will occur. The time window start may describe when the hint is effective. The hint may also describe for how long the hint may be considered. The hint consumer may use this information to take action at some point during the time window duration or to leave the object unaffected. The duration parameter can be used for applications such as MAID, allowing the engine to match hints involving similar time windows together to optimize spin down for unimportant data. In a particular embodiment, the hint describing duration may be in the form of date DDMYYY and time HHMM in 24 hour.

Time Window Recurrence

In some embodiments, a parameter of a hint may describe whether a time window may happen once or may recur periodically. In other embodiments, a parameter of a hint may denote that event described may occur again.

Event Profile Indicator

In other embodiments, a parameter of a hint may contain a request to profile an event visible to the hint producer, by capturing details of the event in the context of the hint consumer. In certain embodiment, profiling an event may require two hints, one to start and one to stop profiling. In other embodiments, the recurrence of a previously profiled event may be signaled. In further embodiments, signaling an event may require just one hint with a hint name, application identifier and time window specified Service Level Status In some embodiments, a parameter of a hint may contain information about whether or not a service level objective or a level of performance is being met. In a particular embodiment, if service levels are being met, a hint consumer such as FAST might decide not to consider the data extent involved as part of the FAST engine analysis, or might relax its efforts to improve service levels. In alternative embodiments, if the hint producer identifies the current service level as below current needs, the storage platform may have remediation policies that allow it to adjust resources accordingly to meet application needs.

Considerations for Hint Consumers

In some embodiments, the hint consumer may implement information requested in the hint or ignore it based on a policy. In certain embodiments, a hint consumer may consider certain types of information in determining how to response to a hint. Some considerations may include hint security, multiple hints, hint conflicts, actions and plans, or logging.

Security

In some embodiments, the hint producers, hint consumers, and hint transformers may use a given level of security. In other embodiments, a hint consumer may need only consume or consider a hint if it is conforms to a given level of security. In certain embodiments, a hint producer (or hint transformer) may need to authenticate a hint to issue a valid hint. In some embodiments, once a hint is authenticated, a hint producer may be authorized to issue hints for objects. In further embodiments, a hinting interface is not broken down into specific functions as an authorized issuer can specify any type of hint for any object. In still other embodiments, the hint producer and application may not be the same entity so the authentication and authorization interface may map hint producers to specific applications. In further embodiments, hints for specific application volumes or sub-volumes may come from authorized hint producers.

Dealing with Multiple Hints

In certain embodiments, a hint consumer may need to consider multiple hints at one time. In at least some embodiments, each application or hint producer may generate hints in isolation. In some embodiments, this may mean the hint producer has no knowledge of other hints being generated or of the downstream impact of the hints generated. In other embodiments, each management application or hint consumer may have to represent and consider multiple hints. In some embodiments, to respond to hints, a hint consumer may consider what hints are active for the target time window, which hints are in conflict with each other, whether there are policies that can act on the content of a hint ("implement" the hint), what will be the impact of acting on a hint, what is the historic "success rate" of the hints from this application. In further embodiments, the hint consumer may develop an assessment of the historical "credibility" of the hint producer.

Hint Conflicts

In some embodiments, a hint producer may need to respond to conflicting hints. In certain embodiments, a hint may conflict with another hint in areas such as object importance, object classification, event likelihood, workload profile, level of certainty, time window recurrence, or SLO achievement. As well, in other embodiments, a complication is that the time windows mentioned in hints may coincide, overlap, or follow sequentially.

In further embodiments, a hint consumer may apply a conflict resolution policy. This policy may resolve the conflict among hints or denote that human intervention or automated action is needed to resolve such a conflict. In alternative embodiments, the hint consumer may halt on conflict, allow the first hint to be the hint which is followed, allow the last hint to be the hint which is followed, order the hints based on level of certainty, order hints based on application identity, or order hints based on application credibility. In other embodiments, two hints defined for the same time window or for the same object do not necessarily conflict, however the hint consumer may decide how to deal with multiple hints about overlapping objects or time windows.

Actions and Plans

In some embodiments, hint consumers may process and act on a hint in a variety of ways based on one or more policies. In some embodiments the hint consumer may ignore the hint, record the hint payload for a later planning cycle, transform the hint and continue processing (i.e., a transformation such as increasing the level of importance of the task), reprioritize or reclassify objects or actions based on the hint, or take specific actions suggested by the hint such as starting to profile an event.

Logging

In other embodiments, a hint consumer may log hints. In some embodiments, the log may include the hint payload, the effect of the hint, such as whether or not the hint was acted on, and a hint-consumer-specific metric of impact. In some embodiments, such as with FAST, the IO capture rate may be logged in the target time window. In other embodiments, the hint consumer may log hint conflicts and may alert about hint security issues.

Hint Transformation from Producer to Consumer Context

In some embodiments, a hint producer may produce a hint in a format a hint consumer may not understand. In at least some of these embodiments, a hint transformer transforms or translates the hint producer's hint, such as a hint about application data objects into a hint which may be consumed by the hint consumer, such as a hint about storage volumes or sub-volumes.

In other embodiments, there may be multiple architectural patterns around hint transformers. Hint transformers may be packaged within hint producers, may be found along the path between hint producers and consumers, or may be packaged in hint consumers. In further embodiments, there may be many types of transformations that hint transformers may perform singly or in combination.

Types of Transformations

In some embodiments, a hint transformer may map an object to an object at a lower level of abstraction. In some embodiments, a hint transformer may map a hint from an application to its data objects (such as a filename, table space name, or virtual disk (Vdisk) ID), or from a storage set to the volume(s) it resides on, or from an activity (e.g., Enterprise Resource Management (ERM) database maintenance) to the affected volumes. In certain embodiments, the transformation may transform the object in the hint and may change other parameters. In some embodiments, the transformation may impact the importance qualifier or importance of the event. In a particular embodiment, such as for a Vdisk ID, a transformation may use VMware vSphere with a Blocklist API.

In an embodiment, the hint transformer may transform a set of database indices to the corresponding volumes or sub-volumes. In an alternative embodiment, a hint transformer may transform a hint that a particular event is going to occur to a request to move a set of volumes or sub-volumes into cache or highly accessible storage. In a further embodiment, a hint transformer may transform a hint about data becoming stale to migrate a set of volumes or sub-volumes to a lower tier of storage.

Service Level Objective

In an alternative embodiment, a hint transformer may map a high level SLO to a low level SLO for a particular line of service. In a particular embodiment the hint transformer may map a hint from an application level metric (e.g. SAP transaction response time during peak time windows) to a storage level metric (e.g. average response time for reads during the same time windows).

In a further embodiment, a hint transformer may add or change details of the hint. In some embodiments, a hint transformer may infer workload intensity from hint name or insert or modify the Importance qualifier.

Classification Scheme

In some embodiments, a hint transformer may map one classification scheme and the associated class to another classification scheme and class at a boundary. In at least some embodiments, this may be beyond a level which the original classification scheme would be valid to the hint consumer or actionable by its policies. In certain embodiments, this may be done to achieve a canonical (unifying) classification scheme.

In a particular embodiment, a hint transformer may map "Social Security Number" into "PII" or "personally identifying information." In another embodiment, a hint transformer may act as a classifier with respect to a classification scheme unknown to the original hint producer.

In an embodiment, a policy may require that information containing email addresses must be purged within 6 months. In this embodiment, a new classification scheme "Contains Email Address" may be applied to data in motion by a hint transformer, using classes "Y" and "N," to enable an appropriate action to be taken by policy engines at hint consumers as the data progresses.

Time

In other embodiments, a hint transformer may change a recurring time window to a single-time time window, where the transformed hint may be immediately actionable. In some embodiments, higher level scheduling concepts may be transformed to specific time windows such as a translation from a hint consumer's hint of Production to a specific time such as 8 AM-5 PM, Feb. 5, 2009.

Hiding Information

In certain embodiments, a hint transformer may transform a hint to hide information from the hint consumer. In a particular embodiment, the tokenization Server in RSA's Key Manager may transform an original credit card number through token-based data substitution to a token that cannot be linked directly back to the original, which may be provided to the hint consumer.

Object Context

In some embodiments, a hint producer, such as a management application, may give a hint to FAST about a data object, such as a DBMS tablespace containing customer tables. In at least some of these embodiments, this data object may not have meaning to FAST as a hint consumer. In these embodiments, FAST may deal with volumes and sub-volumes that it moves across storage types according to policy. In the FAST context, a storage set comprising volumes may be the proxy or translation for an application data object. In these embodiments, it may be beneficial to provide the hint consumer or FAST with the storage set(s) which correspond to the data object.

In some embodiments, the application or hint producer may perform the transformation at the source of the hint, if the hint producer has information about the lower level context. In alternative embodiments, the hint consumer, e.g. FAST, may perform the transformation at the destination of the hint, if it knows the mapping or how to access a mapping table. In further embodiments, a hint transformer may perform the mapping as an independent component. In some of these embodiments, the hint transform may know the mapping or how to access a mapping table to perform the transformation. In further embodiments, there may be multiple mappings in the hint transformer if the original hint was about an application, which may needed to be mapped to its data objects, which in turn needed may need to be mapped to volumes or sub-volumes for the FAST context.

Virtualization

In VMware vSphere and other virtualized environments, there may be management visibility from one level to the next, but not beyond. In some embodiments, it may be a goal of the hint transformer approach to transform objects, goals, classifications, and other attributes from one level to the next. In certain embodiments, there may be a need to hint about virtual machines (VMs) with respect to their characteristics and objectives. In some of these embodiments, the hint producer-transformer-consumer model may provide flexibility in bundling transformations or in daisy-chaining them.

In the foregoing specification, the invention has been described with reference to specific exemplary embodiments thereof with respect to data storage. However, it will be evident that various modifications and changes may be made to the specific exemplary embodiments without departing from the broader spirit and scope of the invention as set forth in the appended claims. In certain embodiments, the invention described herein may be used to manage any type of resource such as a server, memory, one or more networks, or one or more virtual machines. Accordingly, the specification and drawings are to be regarded in an illustrative rather than a restrictive sense.

Figure 19:
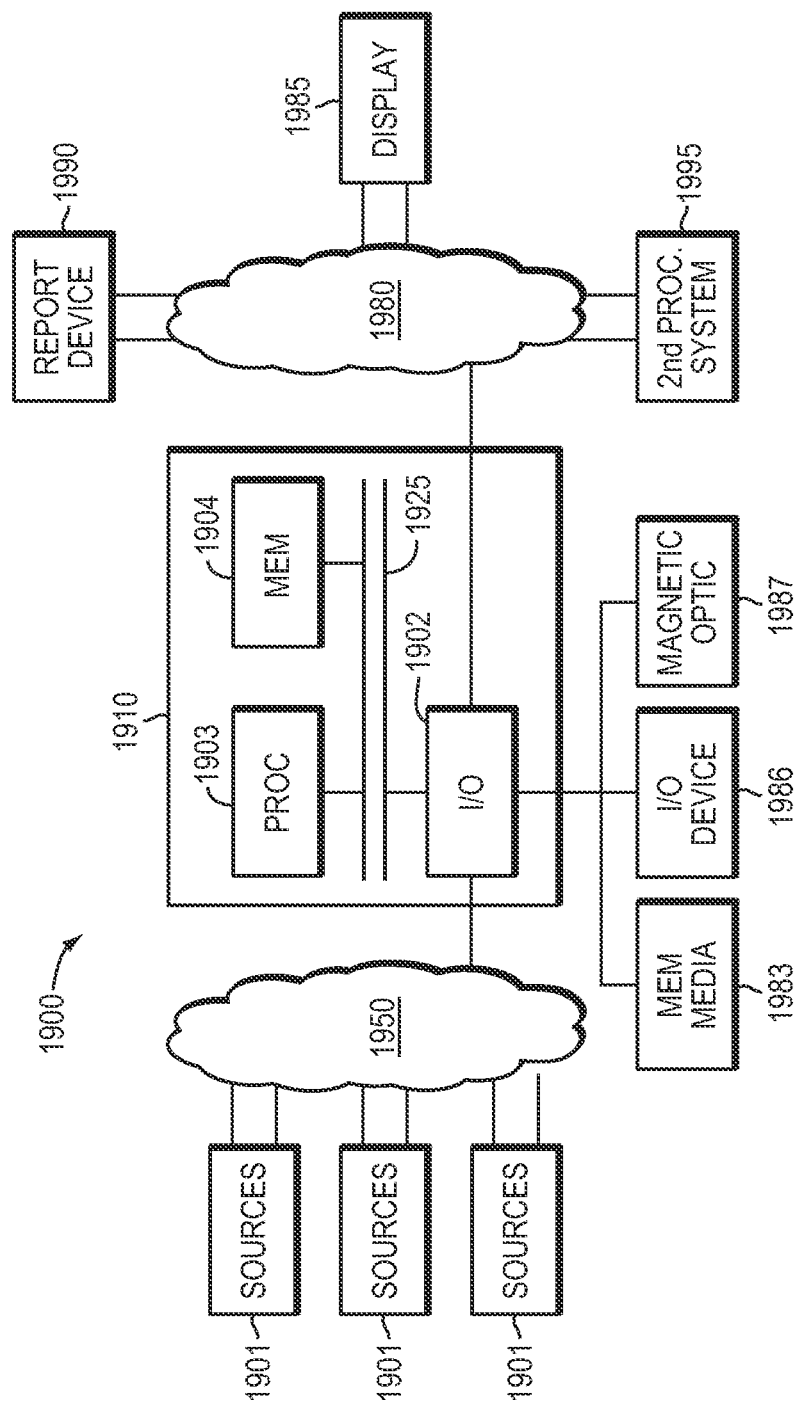
FIG. 19 illustrates an alternative embodiment of the present invention as loaded on a computer.
Figure 20:
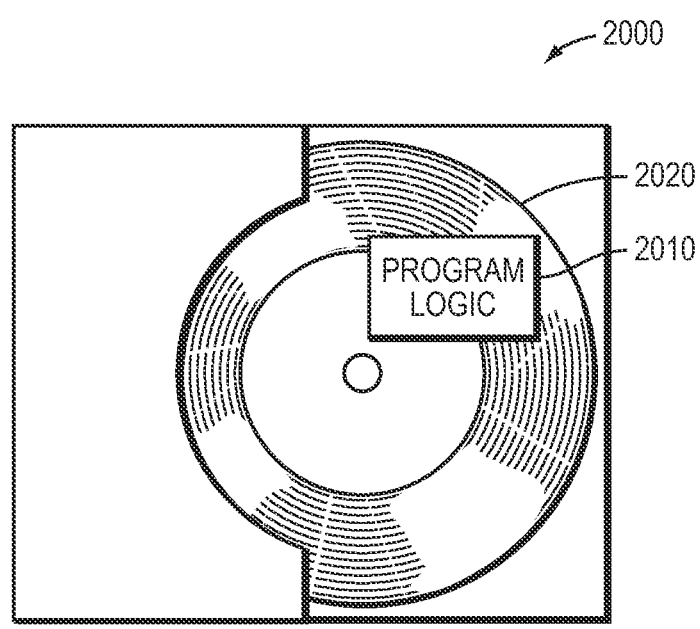
FIG. 20 illustrates embodiment of the current invention in program code.

The methods and apparatus of this invention may take the form, at least partially, of program code (i.e., instructions) embodied in tangible media, such as floppy diskettes, CD-ROMs, hard drives, random access or read only-memory, or any other machine-readable storage medium. When the program code is loaded into and executed by a machine, such as a computer, the machine becomes an apparatus for practicing the invention. When implemented on one or more general-purpose processors, the program code combines with such a processor to provide a unique apparatus that operates analogously to specific logic circuits. As such a general purpose digital machine of FIG. 19 can be transformed into a special purpose digital machine. FIG. 20 shows Program Logic 2010 embodied on a computer-readable medium 2020 as shown, and wherein the Logic is encoded in computer-executable code configured for carrying out the reservation service process of this invention and thereby forming a Computer Program Product 2000.

The logic for carrying out the method may be embodied as part of the system described below, which is useful for carrying out a method described with reference to embodiments shown in, for example, FIG. 1 and FIG. 3. For purposes of illustrating the present invention, the invention is described as embodied in a specific configuration and using special logical arrangements, but one skilled in the art will appreciate that the device is not limited to the specific configuration but rather only by the claims included with this specification.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A computer-executable method for dynamically managing resources of a data storage system, wherein the resources include a data storage device, the computer-executable method comprising:

receiving a hint at the data storage system by a hint consumer; wherein the hint includes information relating to an application; wherein the information is in a first contextual level of contextual levels; wherein each of the contextual levels relates to an abstraction of the resources of the data storage system;

transforming the hint into a transformed hint by a hint transformer; wherein the transformed hint includes transformed information at a second contextual level related to the data storage device, wherein the transformed information of the second contextual level is mapped from the information of the hint produced by a hint producer at the first contextual level; wherein the hint transformer transforms the hint that a particular event is going to occur to request management of a behavior of the data storage system; wherein the information of the transformed hint is at a level of abstraction understood and capable of being used by the hint consumer; wherein the hint consumer consumes hints at the second contextual level;

consuming the transformed hint at the data storage device by the hint consumer, wherein the data storage device is enabled to understand the transformed hint; and determining, at the hint consumer, whether or not to act on the information in the transformed hint; wherein the hint consumer is enabled to respond to the transformed hint in a variety of ways and enabled to consider multiple transformed hints by determining if the transformed hint is still relevant; wherein the hint consumer is further enabled to determine if the multiple transformed hints are in conflict with each other to resolve transformed hint conflicts.

2. The computer-executable method of claim 1, wherein the determining is based on one or more policies, wherein the one or more policies includes a rule for managing the behavior of the data storage system.

3. The computer-executable method of claim 1, wherein the hint contains information about an upcoming request for application data from the data storage device.

4. The computer-executable method of claim 1, wherein the transformed information is created by mapping the hint at the first contextual level to the transformed information at the second contextual level.

5. The computer-executable method of claim 1, wherein the transformed hint signals a start of an event at the data storage device.

6. The computer-executable method of claim 1, wherein one or more transformations are applied to the hint before being received at the data storage system.

7. A system, comprising:
a memory and one or more processors;
a data storage system, including a data storage device; and computer-executable code configured to enable the steps comprising:
receiving a hint at the data storage system by a hint consumer; wherein the hint includes information relating to an application; wherein the information is in a first contextual level of contextual levels; wherein each of the contextual levels relates to an abstraction of the resources of the data storage system;
transforming the hint into a transformed hint by a hint transformer; wherein the transformed hint includes transformed information at a second contextual level related to the data storage device, wherein the transformed information of the second contextual level is mapped from the information of the hint produced by a hint producer at the first contextual level; wherein the hint transformer transforms the hint that a particular event is going to occur to request management of a behavior of the data storage system; wherein the information of the transformed hint is at a level of abstraction understood and capable of being used by the hint consumer; wherein the hint consumer consumes hints at the second contextual level;
consuming the transformed hint at the data storage device by the hint consumer, wherein the data storage device is enabled to understand the transformed hint; and
determining, at the hint consumer, whether or not to act on the information in the transformed hint; wherein the hint consumer is enabled to respond to the transformed hint in a variety of ways and enabled to consider multiple transformed hints by determining if the transformed hint is still relevant; wherein the hint consumer is further enabled to determine if the multiple transformed hints are in conflict with each other to resolve transformed hint conflicts.

8. The system of claim 7, wherein the determining is based on one or more policies, wherein the one or more policies includes a rule for managing the behavior of the data storage system.

9. The system of claim 7, wherein the hint contains information relating to an upcoming request for application data from the data storage device.

10. The system of claim 7, wherein the transformed information is created by mapping the hint at the first contextual level to the transformed information at the second contextual level.

11. The system of claim 7, wherein the transformed hint signals a start of an event at the data storage device.

12. A computer program product for dynamically managing resources of a data storage system, wherein the resources include a data storage device, the computer program product comprising:
a non-transitory computer readable medium encoded with computer-executable program code for using read signatures in replication, the code configured to enable the execution of:
receiving a hint at the data storage system by a hint consumer; wherein the hint includes information relating to an application; wherein the information is in a first contextual level of contextual levels; wherein each of the contextual levels relates to an abstraction of the resources of the data storage system;
transforming the hint into a transformed hint by a hint transformer; wherein the transformed hint includes transformed information at a second contextual level related to the data storage device, wherein the transformed information of the second contextual level is mapped from the information of the hint produced by a hint producer at the first contextual level; wherein the hint transformer transforms the hint that a particular event is going to occur to request management of a behavior of the data storage system; wherein the information of the transformed hint is at a level of abstraction understood and capable of being used by the hint consumer; wherein the hint consumer consumes hints at the second contextual level;
consuming the transformed hint at the data storage device by the hint consumer, wherein the data storage device is enabled to understand the transformed hint; and
determining, at the hint consumer, whether or not to act on the information in the transformed hint; wherein the hint consumer is enabled to respond to the transformed hint in a variety of ways and enabled to consider multiple transformed hints by determining if the transformed hint is still relevant; wherein the hint consumer is further enabled to determine if the multiple transformed hints are in conflict with each other to resolve transformed hint conflicts.

13. The computer program product of claim 12, wherein the determining is based on one or more policies, wherein the one or more policies includes a rule for managing the behavior of the data storage system.

14. The computer program product of claim 12, wherein the hint contains information relating to an upcoming request for application data from the data storage device.

15. The computer program product of claim 12, wherein the transformed information is created by mapping the hint at the first contextual level to the transformed information at the second contextual level.

16. The computer program product of claim 12, wherein the transformed hint signals a start of an event at the data storage device.

17. The computer program product of claim 12, wherein one or more transformations are applied to the hint before being received at the data storage system.

* * * * *